United States Patent Office 3,245,337
Patented Apr. 12, 1966

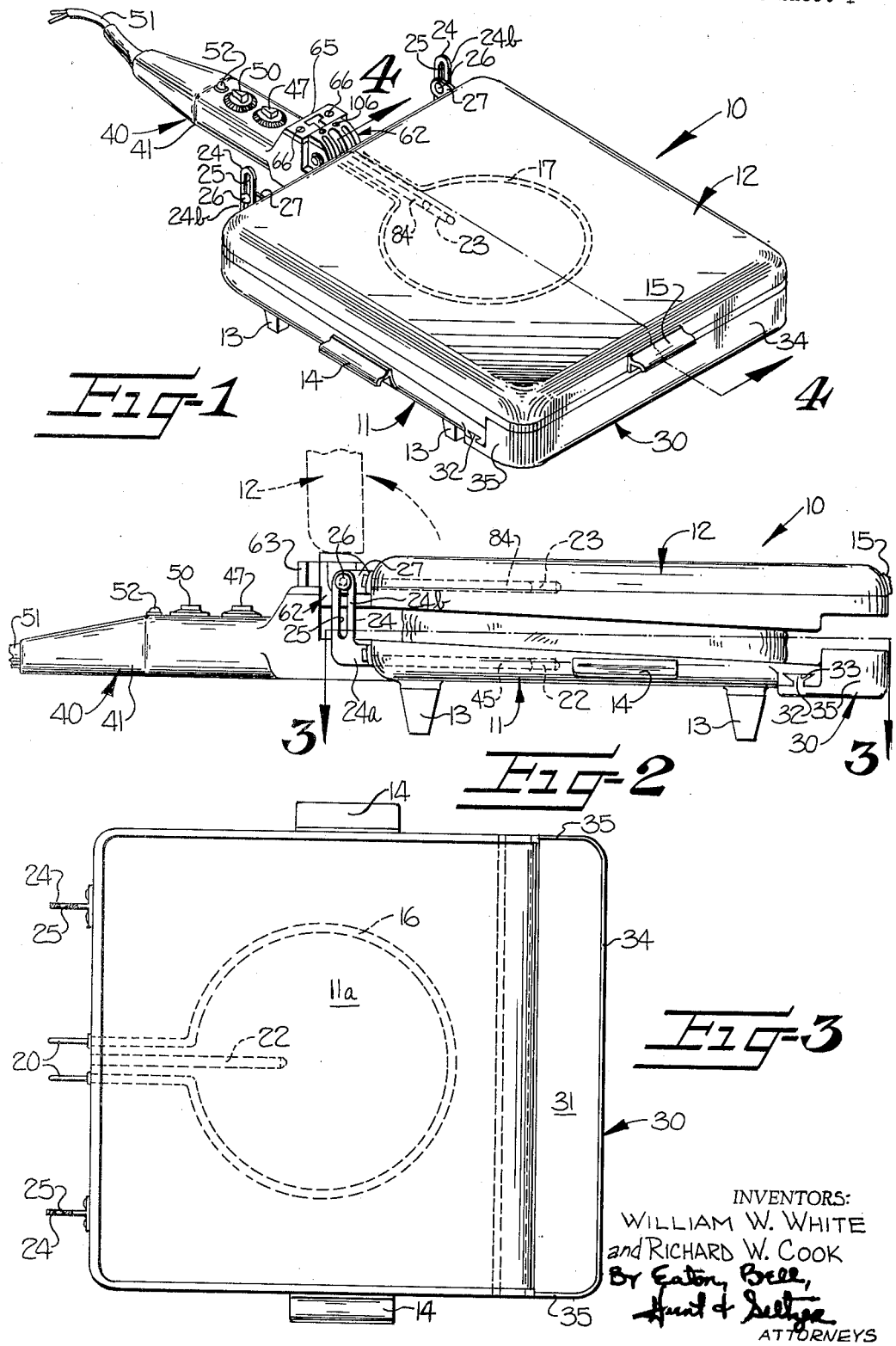

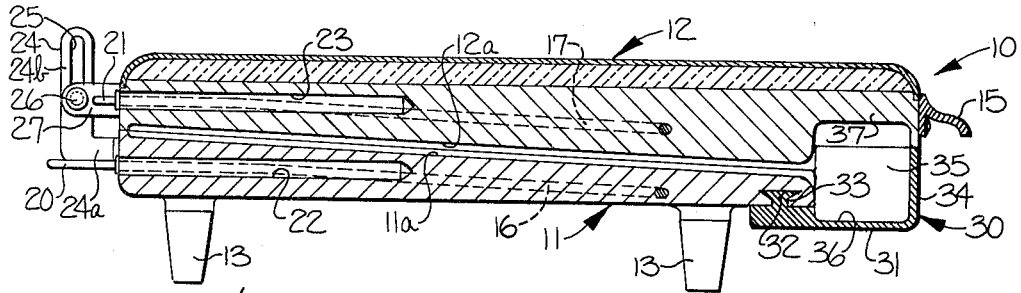
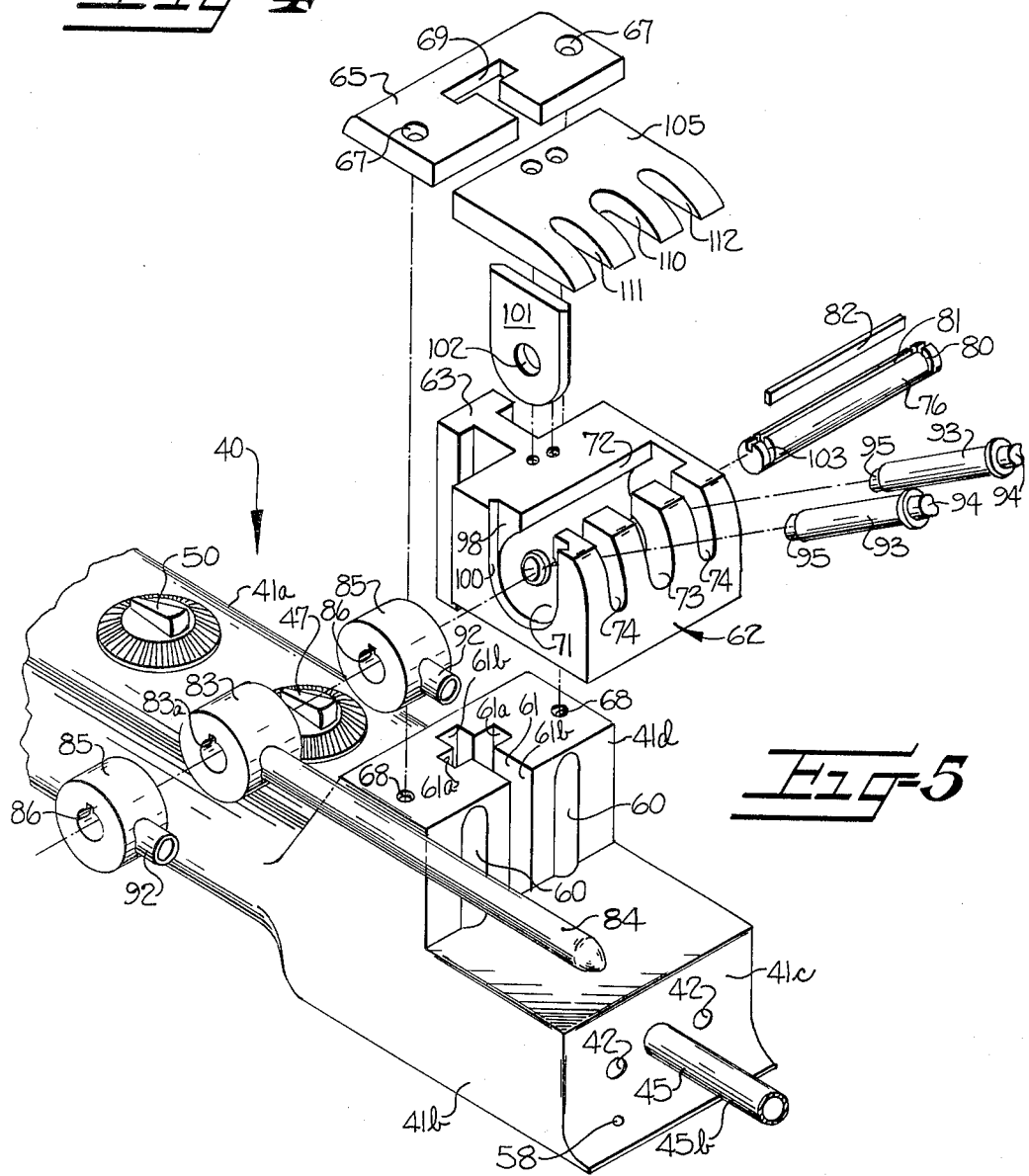

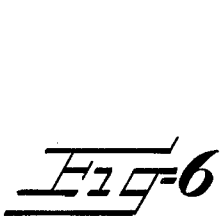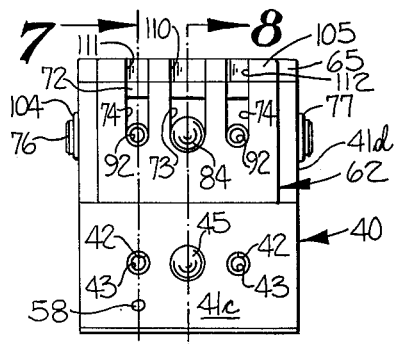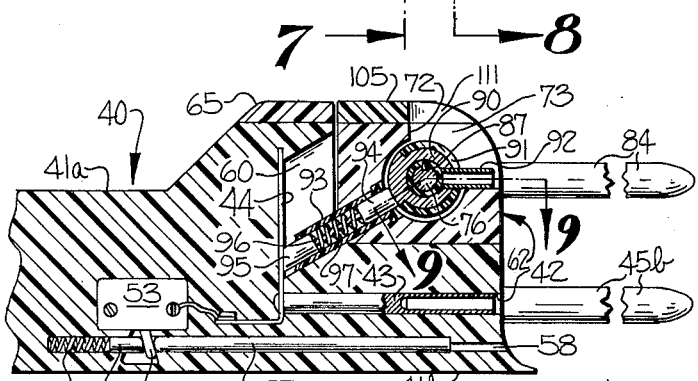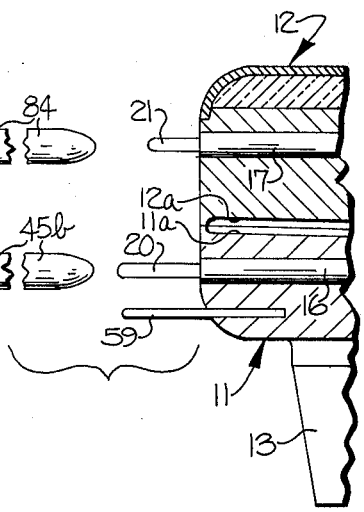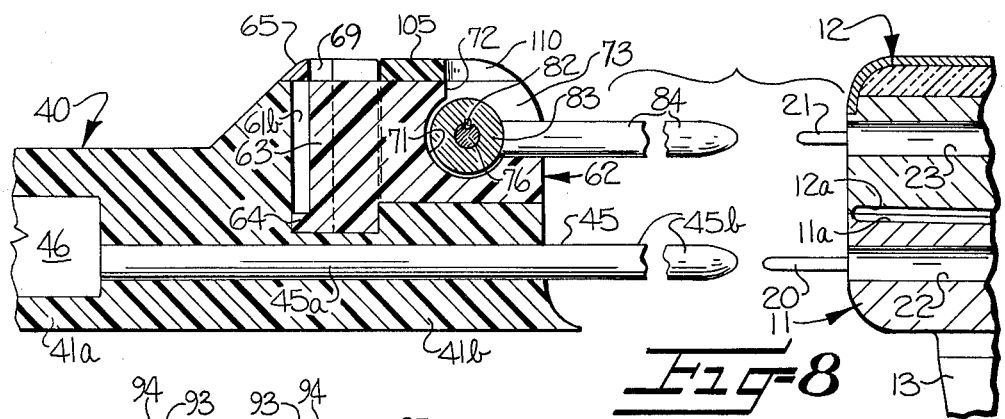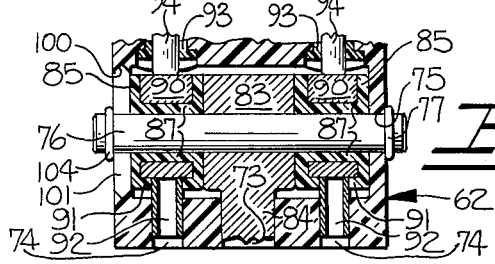

3,245,337
GRILL AND CONTROL UNIT THEREFOR
William W. White, 201 Laurel Circle, and Richard W. Cook, 1st St., both of Black Mountain, N.C.
Filed Dec. 10, 1963, Ser. No. 329,500
14 Claims. (Cl. 99—331)

The present invention relates to electrical appliances and more particularly to an improved grill for grilling articles of food such as strips of bacon or the like simultaneously from both sides and to a novel control unit for such a grill.

Electrical grills for grilling articles of food simultaneously from both sides are known, but problems have been encountered in the use of these conventional grills, both as to the disposition of rendered fat or other natural juices of the articles of food being cooked, and as to the heating of the grill. As is well known, it is highly desirable to cook bacon and similar articles of food in a substantial dry state and in a flat condition with the fat or the like being rendered therefrom kept at a minimum around the cooking bacon. Heretofore, while some conventional grills attempted to dispose of the rendered fat or the like during the cooking of the articles of food, such attempts have resulted in very unsightly grills and have presented very serious problems in the cleaning of the grills and in the maintenance of such grills in a sanitary condition. Due to these problems, none of these conventional grills have been commercially successful.

Conventional grills of this type usually have heated upper and lower grilling members and the connection of the upper heating element to a source of electrical energy is a very serious problem in such grills due to the pivotal and vertically adjustable mounting of the upper grilling members. Usually, this connection is by flexible conductors or cable which is subject to excessive wear and which prevents immersion of the grill in a cleaning fluid.

It is therefore an object of the present invention to provide an improved grill which obviates the aforementioned problems encountered with conventional grills and wherein the rendered fat or the like is collected away from the cooking food and may be readily disposed of and the grill readily cleaned.

Another object of the present invention is to provide an improved grill of the character described and a novel control unit therefor wherein the entire grilling unit may be immersed in a cleaning fluid without deleterious effects thereon and wherein the pivotal movement of the upper grilling member does not cause excessive wear on the control unit.

A more specific object of the present invention is to provide a removable control unit for an electrical appliance, such as a grill, wherein upper and lower contact receptacle means are provided, the upper contact receptacle means being mounted for vertical adjustment and pivotal movement, thereby moving with the upper grilling member and obviating the aforementioned problems encountered in the heating of conventional grills.

Some of the objects of the invention having been stated, other objects will appear as the description proceeds, when taken in connection with the accompanying drawings, in which:

FIGURE 1 is an isometric view of a grill and control unit therefor embodying the features of the present invention;

FIGURE 2 is a side elevational view of the grill and control unit as shown in FIGURE 1 and illustrating the manner of using the grill for cooking articles of food;

FIGURE 3 is a sectional view taken substantially along line 3—3 in FIGURE 2 with the control unit removed;

FIGURE 4 is a sectional view taken substantially along line 4—4 in FIGURE 1;

FIGURE 5 is a fragmentary enlarged exploded isometric view of the control unit of the present invention;

FIGURE 6 is an end elevational view of the assembled control unit as shown in exploded condition in FIGURE 5;

FIGURE 7 is a fragmentary enlarged sectional view taken substantially along the line 7—7 in FIGURE 6 and showing the control unit disposed adjacent the grill of the present invention;

FIGURE 8 is a view similar to FIGURE 7 taken substantially along line 8—8 in FIGURE 6; and FIGURE 9 is an enlarged fragmentary sectional view taken substantially along line 9—9 in FIGURE 7.

Referring now to the drawings, and more particularly to FIGURES 1 through 4 thereof, there is shown a grill 10 incorporating features of the present invention and which is preferably substantially rectangular. Grill 10 includes a lower grilling member 11 and an upper grilling member 12, which have respective upper and lower grilling surfaces 11a, 12a which slope forwardly and downwardly toward the front of grill 10. Grilling surfaces 11a, 12a are adapted to receive articles of food, such as strips of bacon, to be cooked therebetween.

Lower grilling member 11 includes a leg member 13 adjacent each corner thereof which support grill 10 on any suitable supporting surface. Also, suitable handles 14 of a heat insulating material are mounted on opposite sides of lower grilling member 11 for handling of grill 10 and a similar handle 15 is mounted on the front of upper grilling member 12 for the same reason.

Lower grilling member 11 and upper grilling member 12 are formed of any suitable material such as cast aluminum or the like, and have electrical resistance heating elements 16, 17, respectively (FIGURE 4), cast therein adjacent and generally parallel to the grilling surfaces thereof. Heating elements 16, 17 terminate at their opposite ends in spaced apart contact pins 20, 21, respectively, which extend rearwardly of lower and upper grilling members 11, 12 (FIGURES 4 and 7). It is noted that contact pins 20, 21 are sealed relative to the lower and upper grilling members 11, 12 to prevent the entry of foreign matter into the area of resistance heating elements 16, 17, and that pins 20 preferably extend rearwardly of lower grilling member 11 a greater distance than pins 21 extend rearwardly of upper grilling member 12. Elongate openings 22, 23, respectively, are formed in lower and upper grilling members 11, 12 and extend from the rear portion thereof inwardly between opposite end portions of the resistance heating elements 16, 17 adjacent the grilling surfaces 11a, 12a.

A pair of generally L-shaped members 24 have the horizontal legs 24a thereof mounted on the rear of lower grilling member 11 and the vertical legs 24b extending upwardly therefrom. Vertical legs 24b have vertically extending elongate openings 25 therein in which are disposed pins 26 which are mounted on one end portion of member 27. The other ends of member 27 are mounted on the rear of upper grilling member 12. L-shaped members 24 and members 25 thereby mount upper grilling member 12 on lower grilling member 11 for both pivotal movement and vertical adjustment.

A fat or grease collection trough 30 (FIGURES 3 and 4) is mounted on the forward portion of lower grilling member 11 and extends between opposite sides thereof and forwardly therefrom. Trough 30 includes a lower wall 31 which has the rearward portion thereof disposed beneath the forward portion of lower grilling member 11 and includes an upstanding bayonet lug 32 thereon which mates with an undercut groove 33 in the lower surface of lower grilling member 11 for removably mounting trough 30 on the lower grilling member 11.

Trough 30 also includes a front wall 34 formed integral with the forward portion of lower wall 31 and side walls 35 formed integral with opposite ends of front wall 34 and opposite sides of lower wall 31. The lower wall 31 has a depression 36 therein, the rear wall of which is disposed immediately beneath the forward end of lower grilling member 11 and front wall 34 and side walls 35 extend upwardly from lower wall 31 beyond the grilling surface 11a and the rear edges of side walls 35 abut the forward end of the sides of lower grill member 11. Upper grilling member 12 has a portion 37 thereof extending forwardly of the front of the grilling surface 12a thereof, which portion overlies trough 30 when the same is mounted on lower grilling member 11.

The control unit of the present invention is generally indicated at 40 (FIGURES 1 and 5) and includes a housing 41 of any suitable material, but preferably of a molded plastic material. Housing 41 includes a main body portion 41a and forward end portion 41b (FIGURE 5) which extends forwardly of the main body portion and terminates in a forward end 41c which is curved along a line of curvature corresponding to the configuration of the rear portion of lower grilling member 11. Forward end portion 41b of housing 41 has a pair of spaced apart openings 42 therein communicating with forward end 41c and in which are disposed receptacle contact means 43 (FIGURE 7). Receptacle contact means 43 are preferably formed of electrical conductive material, such as copper or the like, and are connected at their inner ends to an electrical switch contact plate 44 which is molded in main portion 41a. Receptacle contact means 43 are adapted to receive pins 20 therein to connect heating element 16 to a source of electrical energy through contact plate 44.

A combination thermostatic sensing element and mounting pin 45 has an interior portion 45a (FIGURE 8) mounted in forward end portion 41b between openings 42, and has an exterior portion 45b extending outwardly from forward end 41c a distance substantially the same as the depth of opening 22 in lower grill member 11 in which pin 45 is adapted to be disposed. The inner end of the thermostatic sensing element and mounting pin 45 is connected to a thermostatic control means 46 (FIGURE 8) which is of conventional type for electrical appliances and includes a rotatable control element (not shown) to which a manual control dial 47 (FIGURES 1 and 5) is operatively connected for controlling the temperature at which the grill 10 will be operated.

A suitable timer (not shown) is also provided in housing 51 and has a manual control dial 50 operatively connected thereto. This timer is of conventional construction and has one side thereof connected to an electrical conductor 51 through a signal light 52 (FIGURE 1). The other side of this timer is suitably connected to thermostatic control 46, which in turn is connected to switch contact plate 44 through a switch 53 (FIGURE 7).

Switch 53 has a control member 54 depending therefrom which is engaged on the rearward side by a plunger 55 which is biased forwardly by a compression spring 56. Switch 53 is thereby biased toward open or unactuated position. An actuator rod 57 is slidably mounted in housing 41 forwardly of control member 54 and has its rearward end engaging the control member. A fourth opening 58 (FIGURES 5 and 7) is provided in the forward portion 41b of housing 41 and communicates with the forward end 41c and with actuator rod 57. A pin 59 is mounted on lower grill member 11 in a position to be received into opening 58 when control means 40 is operatively positioned on grill 10 and is of such length relative to opening 58 such that the same will engage actuator rod 57 and move the same rearwardly to close switch 53 only when pins 20 are fully seated in receptacle contact means 43. This assures that there will be no arcing between receptacle contact means 43 and pins 20.

Housing 41 includes an upstanding portion 41d (FIGURE 5) at the juncture of main portion 41a and forward portion 41b. Upstanding portion 41d has substantially planar forward and top faces and has a pair of spaced apart vertically elongate openings 60 therein which extend rearwardly into communication with switch contact plate 44. Upstanding portion 41d also has a cross shaped vertically elongate opening 61 therein having one portion 61a parallel to the forward face of upstanding portion 41d and another portion 61b perpendicular thereto and communicating therewith. Opening 61 extends for substantially the full height of upstanding portion 41d and communicates with the top face thereof.

A mounting block 62 is mounted on upstanding portion 41d for slidable vertical movement by a T-shaped bayonet lug 63 which is disposed in opening 61 and has a rearwardly extending projection 64 (FIGURE 8) at the bottom which extends into the rear part of portion 61b of opening 61.

A first cover member 65 is mounted on the top face of upstanding portion 41d by suitable screws 66 (FIGURE 1) which penetrate through openings 67 in cover member 65 and into suitable internally threaded openings 68 in upstanding portion 41d. Cover member 65 has a T-shaped opening 69 therein for receipt of the portion of lug 63 above rearwardly extending projection 64 to permit mounting block 62 to be slidably adjusted relative to upstanding portion 41d with cover member 65 and projection 64 serving as a stop to limit the upward movement of block 62.

Mounting block 62 preferably has an upwardly and rearwardly curving forward face and a lateral bore 71 extending substantially therethrough, which bore communicates at one end with one side of the mounting block but terminates short of the other side thereof. Mounting block 62 has an elongate opening 72 formed in the top thereof which communicates and is substantially coextensive with bore 71. Mounting block 62 also has a first vertically elongate slot 73 and second vertically elongate slots 74 on opposite sides of first slot 73, all of which communicate with the forward face of mounting block 62, bore 71 and with the top face of mounting block 62.

The portion closing the other end of the bore 71 has a reduced diameter opening 75 (FIGURE 9) therein which mounts one end of a shaft 76. A snap ring 77 is disposed in a groove 80 in shaft 76 exteriorly of the mounting block 62 to secure the shaft in opening 75. Shaft 76 has a longitudinally extending keyway 81 therein which receives an elongate key 82 therein.

A first collar 83 is mounted on the central portion of shaft 76 and has a key slot 83a therein for receipt of key 82. A mounting pin 84 is mounted at one end on collar 83 and extends outwardly therefrom through first slot 73 and is adapted to be positioned in opening 23 in upper grilling member 12. Second collar members 85 are mounted on shaft 76 on opposite sides of first collar 83 and likewise have keyways 86 therein for receipt of key 82. Each of the collars 85 comprises an inner tubular portion 87 (FIGURE 7) which is preferably formed of a suitable plastic or electrical insulating material, a contact element 90 formed of suitable electrically conductive material, such as copper, surrounding inner portion 87, and an outer portion 91 of electrical insulating material surrounding all but the rear portion of contact portion 90. A tubular member 92 of electrical conductive material has one end thereof mounted in the forward portion of the contact portion 90 of each of the collars 85 and the remainder thereof extending outwardly into one of the slots 74, but terminating short of the front face of mounting block 62. Tubular members 92 form upper receptacle contact means for receipt of pins 21 on upper grilling member 12.

A pair of tubular members 93, only one of which is shown (FIGURE 7), are mounted on mounting block 62 and communicate at one end with bore 71 at second collars 85. Tubular members 93 extend rearwardly and downwardly from bore 71 and terminate adjacent switch contact plate 44. A first brush 94 is disposed in each of the tubular members at the upper end thereof and contacts the contact portion 90 of the corresponding collar 85. A second brush 95 is disposed at the other end of each tubular member 93 and contacts switch plate 44 and is connected to first brush 93 by a wire or conductor 96. A compression spring 97 is positioned between first and second brushes 93, 94 for biasing the same into respective contact with collar 85 and switch plate 44.

The side portion of mounting block 62 at the open end of bore 71 has an upwardly opening generally U-shaped undercut portion 98 (FIGURE 5) defined by V-shaped groove 100. A closure member 101, the side and bottom edges of which correspond in configuration to the configuration of groove 100, is disposed in undercut portion 98 with the side and bottom edges thereof disposed in groove 100. Closure member 101 has an opening 102 therein which receives the other end of shaft 76 which has an annular groove 103 therein and receives a split ring 104 (FIGURE 9) to mount shaft 76 in closure member 101.

A second cover member 105 is mounted on the top face of mounting block 62 by screws 106 in covering relation to slot 72 and has three slots 110, 111, 112 therein which aline with slots 73 and 74 when cover member 105 is mounted on block 62.

While pin 84 is described as functioning merely as a mounting pin, it is contemplated within the scope of the present invention that the same could also be a thermostatic sensing element. In such an event, the same would be operatively connected to the thermostatic control means 46.

In operation, when it is desired to use the grill 10 to cook articles of food, control unit 40 is positioned in operative association with the upper and lower grilling members 11, 12 by inserting combination thermostatic sensing element and mounting pin 45 into opening 22 and mounting pin 84 into opening 23. Upon movement of these pins into the openings, contact pins 20 and 21, respectively, on the lower and upper grilling members move into contact receptacle means 43 and 92, respectively. At the same time, pin 59 moves into opening 58 and contacts actuator rod 57 to move control member 54 of switch 53 to the closed position to connect the contact receptacle means to a source of electrical energy through thermostatic sensing means 46, the timer means and conductor 51.

Upper grilling member 12 is then moved to the substantially vertical position by grasping handle member 15 and lifting upwardly thereon which pivots the upper grilling member 12 about pins 26 in the elongate openings 25. At the same time, pins 26 are moved upwardly in openings 25 to the upper ends thereof. The contact pins 21, receptacle means 92 and mounting pin 84 likewise pivot with shaft 76 to a position just past the vertical, which pivotal movement is permitted by slots 73 and 74 in mounting block 62 and slots 110, 111 and 112 in cover plate 105. Upper grilling member 12 is thereby moved to a position just past the vertical such that the same will remain in this position if desired.

The articles of food are then placed on grilling surface 11a of lower grilling member 11 and upper grilling member 12 is then pivoted downwardly until the same rests upon the articles of food, with grilling surface 12a disposed generally parallel to grilling surface 11a. The temperature of the grilling members is then selected by manually adjusting control knob 47 on the thermostatic control means 46, and the time during which the grill will be heated is selected by manually adjusting control knob 50 which is connected to the timer.

As the articles of food are cooked by grill 10, any rendered fat or the like flows down the forwardly sloping grilling surfaces 11a, 12a of the lower and upper grilling members and collects in the depression 31 in trough 30. Therefore, the articles of food are maintained in a substantially fat-free condition during cooking thereof and the rendered fat or the like is collected away therefrom.

After the articles of food have been cooked, trough 30 may be removed from lower grilling member 11 by sliding the same laterally thereof and the collected fat or the like may be easily emptied therefrom. The trough may then be separately cleaned and replaced on lower grilling member 11. If desired, control unit 40 may be easily and quickly removed from association with the lower and upper grilling members and the lower and upper grilling members may be immersed in a cleaning fluid for quick and easy cleaning thereof.

It will therefore be readily apparent that a novel grill for simultaneously cooking articles of food on both sides is provided wherein the rendered fat or the like is collected away from the food and may be readily disposed of and wherein the grill may be easily and quickly cleaned to maintain the same in a sanitary condition. Also, a removable novel control unit is provided for such a grill which connects the same to a source of electrical energy while permitting both pivotal and vertical adjustable movement of the upper grilling member, which control unit is not subject to excessive wear or does not require frequent maintenance.

In the drawings and specification there has been set forth a preferred embodiment of the invention and, although specific terms are employed, they are used in a generic and descriptive sense only and not for purposes of limitation, the scope of the invention being defined in the claims.

We claim:

1. An electrical grill for cooking articles of food, such as strips of bacon, simultaneously from two sides while maintaining such articles in flat condition, said grill comprising
    (a) a lower grilling member having a downwardly and forwardly sloping, substantially planar, upper grilling surface, and an electrical resistance heating element embedded therein below said upper grilling surface,
    (b) a trough member removably mounted on the forward portion of said lower grilling member and forming a forward extension thereof for collecting rendered fat or the like liberated from articles of food during cooking thereof, and
    (c) an upper grilling member mounted on said lower grilling member for pivotal movement about a horizontal pivot and for vertical adjustment relative to said lower grilling member, said upper grilling member having a downwardly and forwardly sloping, substantially planar, lower grilling surface, and an electrical resistance heating element embedded therein above said lower grilling surface, said upper grilling member having a portion extending forwardly of said lower grilling member and into overlying closing relation to said trough member.

2. The structure as recited in claim 1 wherein said trough member includes a portion underlying the forward portion of said lower grilling member, and said lower grilling member and said portion of said trough member having cooperating undercut groove and lug means removably mounting said trough member on said lower grilling member.

3. The structure recited in claim 1 wherein said heating elements in said lower and upper grilling members are generally parallel to the grilling surfaces of said grilling members and terminate at the rear of said grilling members in superposed pairs of spaced apart contact pins extending rearwardly of said grilling members, and at least said lower grilling member having an elongate opening communicating with the rear portion thereof between said contact pins thereon and extending forwardly for a predetermined distance for receipt of a thermostatic sensing element.

4. The structure recited in claim 3 including (d) a control unit comprising
(1) a thermostatic sensing element positioned in said opening in said lower grilling member,
(2) thermostatic control means operatively connected to said thermostatic sensing element and adapted to be connected to a suitable source of electrical energy,
(3) lower receptacle contact means having said lower contact pins received therein and being operatively connected to said thermostatic control means for supplying electrical energy to said heating element in said lower grilling member, and
(4) upper receptacle contact means having said contact pins on said heating element in said upper grilling member received therein and being operatively connected to said thermostatic control means, said upper receptacle contact means being mounted for pivotal movement about a horizontal pivot corresponding to the horizontal pivot about which said upper grilling member is pivotally movable and for vertical adjustable movement relative to said lower contact receptacle means.

5. An electrical grill for cooking articles of food, such as strips of bacon, simultaneously from two sides while maintaining such articles in flat condition, said grill comprising
(a) a lower grilling member having a downwardly and forwardly sloping, substantially planar, upper grilling surface, and an electrical resistance heating element embedded therein and terminating in spaced apart contact means,
(b) a collection trough member removably mounted on the forward portion of said lower grilling member and forming a forward extension thereof for collecting rendered fat or the like liberated from the articles of food during cooking thereof,
(c) an upper grilling member mounted on said lower grilling member for pivotal movement about a horizontal pivot and for vertical adjustment relative to said lower grilling member, said upper grilling member having a downwardly and forwardly sloping, substantially planar, lower grilling surface, and an electrical resistance heating element embedded therein and terminating in spaced apart contact means above said contact means on said lower heating element, said upper grilling member having a portion extending forwardly of said lower grilling member and into overlying closing relation to said collection trough member, and
(d) control means adapted to be connected to a source of electrical energy and including lower and upper spaced apart contact means operatively associated with said contact means on said heating elements in said lower and upper grilling members, said upper contact means being mounted for pivotal movement about a horizontal pivot corresponding to the horizontal pivot about which said upper grilling member is pivotally movable and being mounted for vertical adjustable movement relative to said lower contact means.

6. The structure recited in claim 5 wherein said contact means on said heating elements in said lower and upper grilling members comprises spaced apart contact pins extending outwardly from said grilling members, and wherein said contact means on said control means comprises spaced apart receptacle contact means for receipt of the lower and upper contact pins therein, and wherein said control means further includes thermostatic control means operatively associated with said lower grilling member for controlling the temperature at which the grilling surface thereof is maintained during operation of the grill, and switch means operatively connected to said contact receptacle means and operable to connect said contact receptacle means to a source of electrical energy only upon full receipt of said contact pins within said contact receptacle means.

7. An electrical grill for cooking articles of food, such as strips of bacon simultaneously from two sides while maintaining such articles in flat condition, said grills comprising
(a) a lower grilling member having a downwardly and forwardly sloping, substantially planar, upper grilling surface, and an electrical resistance heating element embedded therein and terminating in spaced apart contact pins at the rear of said lower grilling member and extending rearwardly thereof, said lower grilling member having an elongate opening communicating with the rear portion thereof between said contact pins thereon and extending forwardly for a predetermined distance and also having a transversely extending, undercut groove in the lower surface of the forward portion thereof,
(b) a collection trough member having a portion underlying the forward portion of said lower grilling member and having upstanding lug means removably positioned in said undercut groove to removably mount said trough member on said lower grilling member, said trough member forming a forward extension of said lower grilling member and having a depression therein for collecting rendered fat or the like liberated from the articles of food during the cooking thereof which flows down the forwardly sloping upper grilling surface of said lower grilling member and into the collection trough member,
(c) an upper grilling member mounted on said lower grilling member for pivotal movement about a horizontal pivot and for vertical adjustment relative to said lower grilling member, said upper grilling member having a downwardly and forwardly sloping, substantially planar lower grilling surface and an electrical resistance heating element embedded therein and terminating in spaced apart contact pins above said contact pins on said lower heating element, said upper grilling member having a portion thereof extending forwardly of said lower grilling member into overlying closing relation to said trough member and having an elongate opening communicating with the rear portion thereof between said contact pins thereon and extending forwardly for a predetermined distance, and
(d) control means adapted to be connected to a source of electrical energy and including
(1) a thermostatic sensing element positioned in the elongate opening in said lower grilling member,
(2) lower spaced apart receptacle contact means on opposite sides of said thermostatic sensing element for receipt of said contact pins on said lower heating element,
(3) a mounting pin positioned in the elongate opening in said upper grilling member,
(4) spaced apart upper receptacle contact means disposed on opposite sides of said mounting pin for receipt of the contact pins on said upper heating element, said upper contact receptacle means and said mounting pin being mounted for common pivotal movement about a horizontal pivot corresponding to the horizontal pivot about which said upper grilling member is pivotally movable and for vertical movement relative to said lower contact receptacle means and thermostatic sensing element, and
(5) thermostatic control means responsive to said thermostatic sensing element and operatively connected to said upper and lower contact receptacle means for controlling the temperature at which said lower and upper grilling 8. An electrical grill for cooking articles of food, such as strips of bacon, simultaneously from two sides while maintaining such articles in flat condition, said grill comprising (a) a lower grilling member having a substantially planar upper grilling surface, and an electrical resistance heating element embedded therein and terminating in spaced apart contact means, (b) an upper grilling member mounted on said lower grilling member for pivotal movement about a horizontal pivot and for vertical adjustment relative to said lower grilling member, said upper grilling member having a substantially planar lower grilling surface, and an electrical resistance heating element embedded therein and terminating in spaced apart contact means above said contact means on said lower heating element, and (c) control means adapted to be connected to a source of electrical energy and including lower and upper spaced apart contact means operatively associated with said contact means on said heating elements in said lower and upper grilling members, said upper contact means being mounted for pivotal movement about a horizontal pivot corresponding to the horizontal pivot about which said upper grilling member is pivotally movable and being mounted for vertical adjustable movement relative to said lower contact means.

9. The structure recited in claim 8 wherein said upper and lower grilling members each have an elongate opening communicating with the rear portion thereof between said contact means thereon and extending forwardly for a predetermined distance, and wherein said control means includes thermostatic control means operatively connected to the contact means of said control means for controlling the temperature at which said grilling members are operated and including a thermostatic sensing element disposed in the elongate opening in said lower grilling member for sensing the temperature thereof, and a mounting pin disposed in the elongate opening in said upper grilling member and mounted for pivotal and vertically adjustable movement with said upper contact means of said control means.

10. An electrical grill for cooking articles of food, such as strips of bacon, simultaneously from two sides while maintaining said articles in flat condition, said grill comprising (a) a lower grilling member having a substantially planar, upper grilling surface, and an electrical resistance heating element embedded therein and terminating in spaced apart contact pins at the rear of said lower grilling member, said lower grilling member also having an elongate opening communicating with the rear thereof between said contact pins and extending forwardly therein for a predetermined distance, (b) an upper grilling member mounted on said lower grilling member for pivotal movement about a horizontal pivot spaced rearwardly of the rear portions of said upper and lower grilling members and for vertical adjustment relative to said lower grilling member, said upper grilling member having a substantially planar, lower grilling surface, and an electrical resistance heating element embedded therein and terminating in spaced apart contact pins at the rear of said upper grilling member above said contact pins on said lower grilling member, said upper grilling member also having an elongate opening communicating with the rear thereof between said contact pins and extending forwardly therein for a predetermined distance, and (c) control means adapted to be connected to a source of electrical energy and including (1) a housing having a forward portion disposed in contiguous relation to said lower grilling members, (2) lower receptacle contact means mounted in the forward portion of said housing and having the contact pins on the lower grilling member received therein, (3) a thermostatic sensing element carried by the forward portion of said housing between said lower receptacle contact means and being positioned in the elongate opening in the lower grilling member for sensing the temperature thereof, (4) a mounting block mounted on said housing above the forward portion thereof for vertical movement relative to said forward portion, (5) upper receptacle contact means mounted on said mounting block for vertical movement therewith and for pivotal movement relative thereto from a first substantially horizontal position to a second substantially vertical position, said receptacle contact means communicating with the forward face of said mounting block and having the upper contact pins on said upper grilling member received therein, and (6) a mounting pin mounted on the mounting block for vertical movement therewith and for pivotal movement with said upper receptacle contact means and having an outer portion positioned in the elongate opening in said upper grilling member.

11. A control unit for use with an electrical appliance, such as a grill having a lower grilling member and an upper grilling member pivotally mounted on the lower grilling member and for vertical adjustable movement relative thereto, the grilling members having heating elements therein which terminate in superposed pairs of spaced apart contact means, said control unit comprising (a) a housing having a forward portion adapted to be placed in contiguous relation to the lower grilling member of the grill, (b) lower spaced apart contact means carried by the forward portion of said housing for operative association with the contact means on the lower grilling member of the grill, and (c) upper spaced apart contact means mounted on said housing above said lower contact means for operative association with the contact means on the upper grilling member of the electrical grill, said upper contact means being mounted for pivotal movement about a horizontal pivot extending laterally of said housing and also for vertical movement relative to said lower contact means.

12. The structure recited in claim 11 including (d) thermostatic control means mounted within said housing and being operatively connected to said lower and upper contact means for controlling the delivery of electrical energy thereto, said thermostatic control means including a thermostatic sensing element extending outwardly of the forward end of said housing between said lower contact means and adapted to be positioned in an opening in the lower grilling member of the grill for sensing the temperature thereof.

13. A control unit for use with an electrical appliance, such as a grill having a lower grilling member and an upper grilling member mounted on the lower grilling member for pivotal movement about a horizontal pivot and for vertical adjustable movement relative to the lower grilling member, the grilling members having heating elements therein which terminate in superposed pairs of spaced apart contact pins, said control unit comprising (a) a housing having a forward portion adapted to be placed in contiguous relation to the grill at the contact pins thereon, (b) a vertically disposed, elongate contact switch plate mounted in said housing rearwardly of said forward portion, (c) receptacle contact means operatively connected to said contact switch plate and communicating with the forward portion of said housing for receipt of the contact pins on the lower grilling member therein, (d) thermostatic control means mounted within said housing and including a thermostatic sensing element extending outwardly of the forward portion of said housing between said receptacle contact means and adapted to be disposed in an opening in the lower grilling member, said thermostatic control means being operatively connected to said switch contact plate for controlling the delivery of electrical energy thereto, (e) a mounting block mounted on said housing for vertical sliding movement above the forward portion of said housing and forwardly of the upper portion of said switch contact plate, (f) upper spaced apart receptacle contact means, mounted on said mounting block for pivotal movement from a first substantially horizontal position to a second substantially vertical position, said contact receptacle means communicating with the forward portion of said mounting block and being adapted to receive the contact pins on the upper grilling member therein, and (g) brush means extending between said upper contact receptacle means and said switch contact plate and slidably engaging the same for connecting said upper contact receptacle means to said switch plate.

14. The structure recited in claim 13 including (h) a mounting pin mounted on said mounting block for vertical movement therewith and for pivotal movement with said upper receptacle contact means and including a portion extending forwardly of said mounting block and adapted to be positioned in an opening in the upper grilling member.

References Cited by the Examiner

UNITED STATES PATENTS

| | | | |
|---|---|---|---|
| 1,690,570 | 11/1928 | Dalbey | 99—400 X |
| 1,753,879 | 4/1930 | Carter et al. | 99—375 X |
| 1,950,385 | 3/1934 | Burch | 99—375 X |
| 2,710,906 | 6/1955 | Lipsich et al. | 99—331 X |
| 2,744,995 | 5/1956 | Jepson | 99—331 X |
| 3,095,498 | 6/1963 | Foster | 99—331 X |

IRVING BUNEVICH, *Primary Examiner.*

BILLY J. WILHITE, *Examiner.*